United States Patent
Mitariten

(10) Patent No.: US 8,221,524 B2
(45) Date of Patent: Jul. 17, 2012

(54) OXYGEN REMOVAL FROM CONTAMINATED GASES

(75) Inventor: Michael J. Mitariten, Pittstown, NJ (US)

(73) Assignee: Guild Associates, Inc., Dublin, OH (US)

( * ) Notice: Subject to any disclaimer, the term of this patent is extended or adjusted under 35 U.S.C. 154(b) by 404 days.

(21) Appl. No.: 12/604,803

(22) Filed: Oct. 23, 2009

(65) Prior Publication Data

US 2011/0094378 A1    Apr. 28, 2011

(51) Int. Cl.
*B01D 53/22* (2006.01)
*B01D 53/047* (2006.01)

(52) U.S. Cl. ............. 95/54; 95/45; 95/50; 95/51; 95/96; 95/130; 95/138; 95/148; 95/903; 96/4; 96/131; 96/132; 96/143

(58) Field of Classification Search ................ 95/45, 51, 95/54, 96, 130, 138, 148, 50, 903; 96/4, 96/121, 131, 132, 143
See application file for complete search history.

(56) References Cited

U.S. PATENT DOCUMENTS

| | | |
|---|---|---|
| 3,430,418 A | 3/1969 | Wagner |
| 3,751,878 A | 8/1973 | Collins |
| 3,979,330 A | 9/1976 | Munzer et al. |
| 3,986,849 A | 10/1976 | Fuderer et al. |
| 4,077,779 A | 3/1978 | Sircar et al. |
| 4,528,281 A | 7/1985 | Sutt, Jr. |
| 4,540,678 A | 9/1985 | Sutt, Jr. |
| 4,627,857 A | 12/1986 | Sutt, Jr. |
| 4,629,476 A | 12/1986 | Sutt, Jr. |
| 4,938,939 A | 7/1990 | Kuznicki |
| 5,053,058 A | 10/1991 | Mitariten |
| 5,081,097 A | 1/1992 | Sharma et al. |
| 5,938,819 A | 8/1999 | Seery |
| 5,989,316 A | 11/1999 | Kuznicki et al. |
| 6,068,682 A | 5/2000 | Kuznicki et al. |
| 6,197,092 B1 | 3/2001 | Butwell et al. |
| 6,315,817 B1 | 11/2001 | Butwell et al. |
| 6,562,110 B2 | 5/2003 | Koros et al. |
| 6,610,124 B1 | 8/2003 | Dolan et al. |
| 6,878,657 B2 | 4/2005 | Jasra et al. |
| 7,025,803 B2 | 4/2006 | Wascheck et al. |
| 7,250,074 B2 | 7/2007 | Tonkovich et al. |
| 7,875,101 B2 * | 1/2011 | Staiger et al. ............ 95/54 |
| 2007/0006729 A1 | 1/2007 | Mitariten |
| 2007/0068386 A1 * | 3/2007 | Mitariten .............. 95/116 |
| 2009/0107333 A1 * | 4/2009 | Farha et al. .......... 95/138 |
| 2011/0185896 A1 * | 8/2011 | Sethna et al. .......... 95/96 |

FOREIGN PATENT DOCUMENTS

EP    1 811 011 A1 *   7/2007

OTHER PUBLICATIONS

"High Butane Gas Production from Landfill Gas with the Molecular Gate (R) Adsorption System", Mitariten, Michael, Engelhard Corporation, Oct. 2005.*

* cited by examiner

*Primary Examiner* — Jason M Greene
(74) *Attorney, Agent, or Firm* — Frankel & Associates, P.C.

(57) ABSTRACT

The invention relates to a method for achieving low oxygen levels in a natural gas stream without the use of a catalytic system. In one embodiment, the method comprises: membrane treatment for the removal of the bulk of $CO_2$ and oxygen in the natural gas feed and the addition of a PSA system using a carbon molecular sieve adsorbent for the adsorption of residual oxygen.

21 Claims, 2 Drawing Sheets

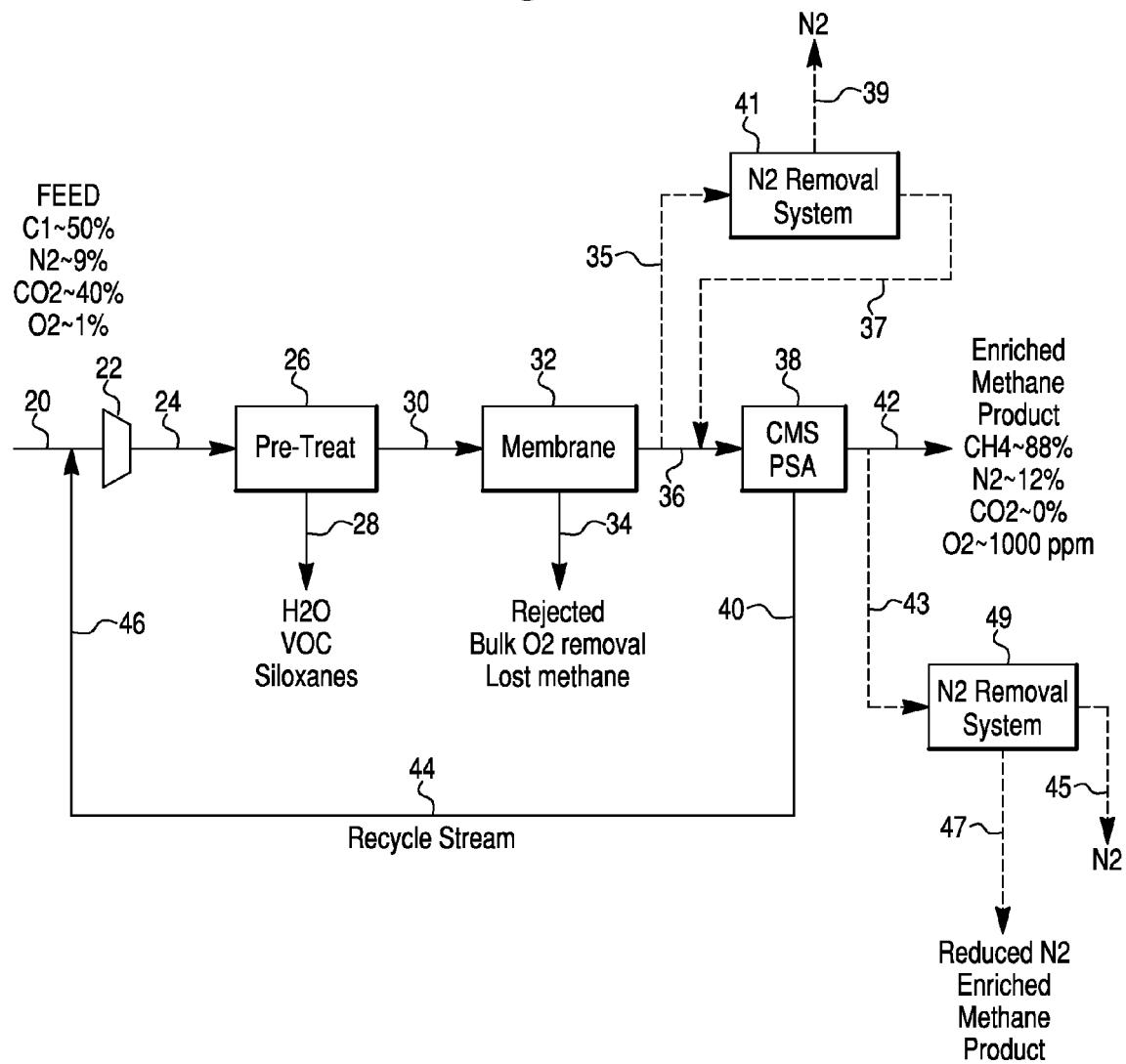

OXYGEN REMOVAL FROM CONTAMINATED GASES

FIELD OF THE INVENTION

This invention relates to the purification of natural gas from a landfill or other contaminated natural gas resource. In particular, the invention is directed to the removal of oxygen from the landfill gas and gases released from coal mining.

BACKGROUND OF THE INVENTION

The U.S. has proven reserves of natural gas totaling over 150 trillion cubic feet. Recently, annual consumption has exceeded the amount of new reserves that were found. This trend has resulted in higher cost natural gas and may possibly result in supply shortages in the future. As the U.S. reserves are produced and depleted, finding new, clean gas reserves involves more costly exploration efforts. This usually involves off-shore exploration, deeper drilling onshore and/or the production of low volume "unconventional" wells all of which are expensive. Moreover, unlike crude oil, it is expensive to liquefy natural gas so that the liquid can be shipped or otherwise transported from areas of production or excess supply and revaporized for local use. Therefore, pricing of natural gas can be expected to rise forcing end users to seek alternative fuels, such as oil and coal, that are not as clean burning as gas. While base consumption for natural gas in the U.S. is projected to grow at 2-3% annually for the next ten years, one segment may grow much more rapidly. Natural gas usage in electric power generation is expected to grow rapidly because natural gas is efficient and cleaner burning allowing utilities to reduce atmospheric emissions. Further use of natural gas as a transportation fuel is a rapidly growing market due to its clean burning features and low cost relative to liquid fuels. Accordingly, there is a need to develop a cost-effective method of upgrading currently unmarketable sub-quality natural gas reserves in the U.S. thereby increasing the proven natural gas reserve inventory.

In addition to the benefits of using landfill gas and other sub-quality natural gas reserves as a source of industrial fuel to meet demand, methane emissions from these various sources also represent a significant portion of non-$CO_2$ greenhouse gas emissions. Traditionally, coal mine and landfill operators have been able to recover only a small percentage of dilute methane gas streams because they contain significant quantities of contaminants, such as $CO_2$, oxygen, water vapor, and nitrogen. Removal of methane from sub-quality sources has the potential to reduce annual greenhouse gas emissions by about 23.5 billion equivalent kilograms of $CO_2$ and to enable to cost-effective recovery of about 3.5 trillion cubic feet per year of natural gas. This represents a reduction of about 0.3% in annual U.S. greenhouse gas emissions at no net cost when the value of pipeline quality natural gas is realized.

When garbage is collected in a sanitary landfill, the decay of the contents leads to the generation of various gases, predominantly methane and carbon dioxide. Landfill gas can also contain nitrogen and oxygen, which is commonly introduced because the landfill gas is collected at low pressure and pulling on the gathering system used to collect the gas can introduce air through various leaks. Upgrading the methane gas from landfills has been widely practiced, most commonly for the production of electric power, but also to produce a high quality synthetic natural gas. Landfill gas compositions include a feed stream that is typically 50% methane, 40% $CO_2$, and with the balance composed of primarily nitrogen plus oxygen with a typical oxygen level of 1%.

One of the major concerns with upgrading landfill gas and other sources of sub-quality natural gas reserves, both for electric power generation or for various fuel consumers, including pipeline gas, is that landfill gas contains a wide variety of impurities. One impurity of concern in landfill gas and other sources of natural gas is oxygen. Oxygen is present in landfill gas and coalmine methane in almost all cases and is occasionally present in other methane and natural gas streams. Pipeline acceptance of gases from such sources requires that the gas meet pipeline quality standards, which include specific limits on impurities such as water vapor, hydrogen sulfide, carbon dioxide, nitrogen and oxygen. The removal of these impurities, with the exception of oxygen, is well-proven and well-established. Further, the pipeline specifications on permitted levels of oxygen range widely and there are cases requiring a low of 10 ppm of oxygen to a high of 1% oxygen or more. This large range of permitted oxygen impacts the technologies and processing for its removal.

Currently, a bulk of the oxygen can be removed from a landfill gas feed during the removal of the $CO_2$ impurity. Upgrading landfill gas by removing the $CO_2$ impurity encompasses a variety of technologies, including solvent-based $CO_2$ wash systems, membrane units where the $CO_2$ is removed by permeation from high pressure to low pressure, and PSA systems where the $CO_2$ is adsorbed and removed from the landfill gas. Of these technologies, the membrane unit offers the added advantage that oxygen will permeate the membrane to a substantial extent when the $CO_2$ is removed. Using a membrane to upgrade the landfill gas permits the removal of the oxygen to moderate levels. Generating a product stream of 2,000 to 5,000 ppm of oxygen can be easily accommodated. When pipeline requirements call for moderate levels of oxygen (i.e., oxygen at 2,000 to 5,000 ppm), landfill gas upgrading by compression, pretreatment for heavy components removal and a membrane unit for the removal of the bulk of the $CO_2$ and oxygen is the preferred approach. This technology has been applied at over a dozen landfills to date.

The use of membranes for gas separations, which is well-known in the art, is done by contacting the feed stream with the surface of the membrane at an elevated pressure and withdrawing the permeate stream at a reduced pressure, relative to the elevated feed pressure. Significant factors in the design and overall efficiency of membrane systems are the total membrane surface area required for a given separation and the partial pressure difference across the membrane that is required to obtain a desired product quantity and quality. The design of membrane systems requires a balancing of these factors. That is, the greater the partial pressure difference, or driving force, across the membrane, the less is the membrane surface area required for a given separation. High pressure difference, low area operation necessitates the use of more expensive compression equipment and higher compressor operating costs, but enables membrane equipment costs to be kept relatively low. If, on the other hand, a lower driving force is employed, more membrane surface area is required, and the relative costs of the various aspects of the overall system and operation would change accordingly.

Membrane systems are often designed and optimized for full capacity, steady flow and composition conditions that are not always encountered in practice. When conditions exist that are different than the design conditions, the products recovered from the membrane system may contain undesirable concentrations of certain components. Under such conditions, different requirements exist with respect to partial pressure differences and membrane area in order to maintain a given product purity. In addition, multiple stage membrane units with permeate recompression and additional stage treatment or recycle to the feed are widely practiced to optimize the product purity and/or recovery of the system.

However, where the product oxygen permitted into the pipeline is lower than about 2,000 ppm, and especially less than 1000 ppm, the use of the membrane unit for oxygen removal results in substantially lower methane recovery. Increasing the amount of oxygen removed using the membrane unit also entails increasing the amount of $CO_2$ removed. This results in additional methane losses where additional methane is permeated across the membrane.

In order to meet the stricter pipeline requirements, a catalytic system can be considered for oxygen removal after the membrane removal step. In a catalytic system, oxygen is reacted over a catalyst bed wherein the methane in the landfill gas (or injected heavier hydrocarbons or other reactive species) and the oxygen form water and $CO_2$. The amount of water and $CO_2$ formed is related to the concentration of oxygen in the feed. Such catalytic systems are well-known in industry and have been applied at facilities where oxygen is required to be removed to typically low ppm levels, such as 10 ppm. However, using a catalytic system to remove oxygen from the landfill gas stream is expensive and results in loss of methane value since the methane is converted to water and carbon dioxide. Thus, an alternative to removing oxygen by using a catalytic system is needed.

Pressure swing adsorption is a well-known method for the separation of bulk gas mixtures and for the purification of gas streams containing undesirable impurities. Gas separations by pressure swing adsorption (PSA) are achieved by coordinated pressure cycling of a bed of adsorbent material which preferentially adsorbs at least one more readily adsorbable component present in a feed gas mixture relative to at least one less readily adsorbable component present in the feed gas mixture. That is, the bed of adsorbent material is contacted with a ready supply of a feed gas mixture. During intervals while the bed of adsorbent material is subjected to the ready supply of feed gas mixture and the bed is at or above a given feed pressure, a supply of gas depleted in the at least one more readily adsorbable component may be withdrawn from the bed. Eventually, the adsorbent material in the bed becomes saturated with the at least one more readily adsorbable component and must be regenerated. At which point, the bed is isolated from the ready supply of feed gas mixture and a gas enriched in the at least one more readily adsorbable component is withdrawn from the bed, regenerating the adsorbent material. In some instances, the bed may be subjected to a purge with depleted gas to facilitate the regeneration process. Once the adsorbent material is sufficiently regenerated, the bed is again subjected to the ready supply of feed gas mixture and depleted gas can once again be withdrawn from the bed once the pressure on the bed is at or above the given feed pressure. This cycle may be performed repeatedly as required.

The use of PSA systems for the removal of impurities, such as nitrogen and carbon dioxide, from natural gas streams are well known and used in the purification of natural gas streams. In general, an effective PSA process for the removal of nitrogen from natural gas, described in U.S. Pat. No. 6,197,092, issued Mar. 6, 2001, involves a first pressure swing adsorption of the natural gas stream to selectively remove nitrogen and produce a highly concentrated methane product stream. Secondly, the waste gas from the first PSA unit is passed through a PSA process which contains an adsorbent selective for methane so as to produce a highly concentrated nitrogen product. One important feature is the nitrogen selective adsorbent in the first PSA unit. The adsorbent is a crystalline titanium silicate molecular sieve adsorbent and is based on ETS-4, which is described in U.S. Pat. No. 4,938,939. Adsorbents having controlled pore sizes are referred to as CTS-1 (contracted titano silicate-1) and are described in U.S. Pat. No. 6,068,682, issued May 30, 2000. The CTS-1 molecular sieve is particularly effective in separating nitrogen and acid gases selectively from methane. Due to the ability of the ETS-4 compositions, including the CTS-1 molecular sieves for separating gases based on molecular size, these molecular sieves have been referred to as Molecular Gate® sieves.

There are also numerous patents that describe PSA processes for separating carbon dioxide from methane or other gases. One of the earlier patents in this area is U.S. Pat. No. 3,751,878, which describes a PSA system using a zeolite molecular sieve that selectively adsorbs $CO_2$ from a low quality natural gas stream operating at a pressure of 1000 psia, and a temperature of 300° F. The system uses carbon dioxide as a purge to remove some adsorbed methane from the zeolite and to purge methane from the void space in the column. U.S. Pat. No. 4,077,779, describes the use of a carbon molecular sieve that adsorbs $CO_2$ selectively over hydrogen or methane. After the adsorption step, a high pressure purge with $CO_2$ is followed by pressure reduction and desorption of $CO_2$ followed by a rinse at an intermediate pressure with an extraneous gas such as air. The column is then subjected to vacuum to remove the extraneous gas and any remaining $CO_2$. The preferred type of adsorbent is activated carbon, but can be a zeolite such as 5A, molecular sieve carbons, silica gel, activated alumina or other adsorbents selective of carbon dioxide and gaseous hydrocarbons other than methane.

U.S. Pat. No. 5,938,819 discloses removing $CO_2$ from landfill gas, coal bed methane and coal mine gob gas, sewage gas or low quality natural gas in a modified PSA process using a clinoptilolite adsorbent. The adsorbent has such a strong attraction to $CO_2$ that little desorption occurs even at very low pressure. There is such an extreme hysteresis between the adsorption of the adsorbent and desorption isotherms, regeneration of the adsorbent is achieved by exposure to a stream of dry air.

The adsorbent material selected for use in the pressure swing adsorption units depends on the component to be separated from the feed stream. Adsorbent materials suitable for use in the pressure swing adsorption apparatus include, but are by no means limited to, activated carbon; carbon molecular sieve (CMS) adsorbents; activated alumina; zeolites; and the titanium silicates, e.g., ETS and CTS materials described above. One skilled in the art would know how to select a given adsorbent material for use with a given feed gas mixture and desired product materials.

Carbon molecular sieves are well-known in the industry and are effective for separating oxygen from nitrogen because the rate of adsorption of oxygen is higher than that of nitrogen. A molecular sieve selectively adsorbs a certain size of molecules due to its uniform pore size, and a carbon molecular sieve is mainly made of a carbon material. The difference in rates of adsorption between oxygen and nitrogen is due to the difference in size of the oxygen and nitrogen molecules. Since the difference in size is quite small, approximately 0.2 A°, the pore structure of the carbon molecular sieve must be tightly controlled in order to effectively separate the two molecules. In order to improve the performance of carbon molecular sieves, various techniques have been used to modify pore size. A common method is the deposit of carbon on carbon molecular sieves. For example, U.S. Pat. No. 3,979,330 to Munzner et. al discloses the preparation of carbon containing molecular sieves in which coke containing up to 5% volatile components is treated at 600° C.-900° C. in order to split off carbon from a hydrocarbon. The split-off carbon is deposited in the carbon framework of the coke to narrow the existing pores. U.S. Pat. Nos. 4,528,281; 4,540,678; 4,627,857 and 4,629,476 to Jr. Robert, S. F. disclose various preparations of carbon molecular sieves for use in separation of gases.

U.S. Pat. No. 5,081,097 to Sharma et. al., discloses copper modified carbon molecular sieves for selective removal of oxygen from an argon gas mixture. The sieve is prepared by pyrolysis of a mixture of a copper-containing material and a polyfunctional alcohol to form a sorbent precursor. The sorbent precursor is then heated and reduced to produce a copper modified carbon molecular sieve. Pyrolysis is a high temperature process making the whole process of preparation of the adsorbent an energy intensive process.

Sometimes landfill gas upgrading requires the removal of nitrogen in addition to removing the oxygen. Where nitrogen is to be removed, the Molecular Gate® process (described earlier) has been applied downstream of a bulk membrane separation unit wherein residual $CO_2$ and nitrogen is adsorbed using a PSA process. In the Molecular Gate® process, oxygen is also partially removed.

SUMMARY OF THE INVENTION

This invention relates to an improved method of oxygen removal from contaminated methane. The removal of oxygen is a challenge for upgrading natural gas, landfill gas, coalmine methane, and occasionally, biogas. This invention utilizes a two-step oxygen removal process and in doing so, allows for the removal of oxygen to relatively low levels without the use of a catalytic process. In the invention, membrane systems (or other bulk oxygen removal systems) are combined with carbon molecular sieve (CMS) pressure swing adsorption (PSA) technology for oxygen removal.

BRIEF DESCRIPTION OF THE DRAWINGS

FIG. 2 represents a schematic of the process of an embodiment of the present invention which illustrates the removal of oxygen from a contaminated methane feed gas using carbon molecular sieve pressure swing adsorption.

DETAILED DESCRIPTION OF THE INVENTION

Figure 1:
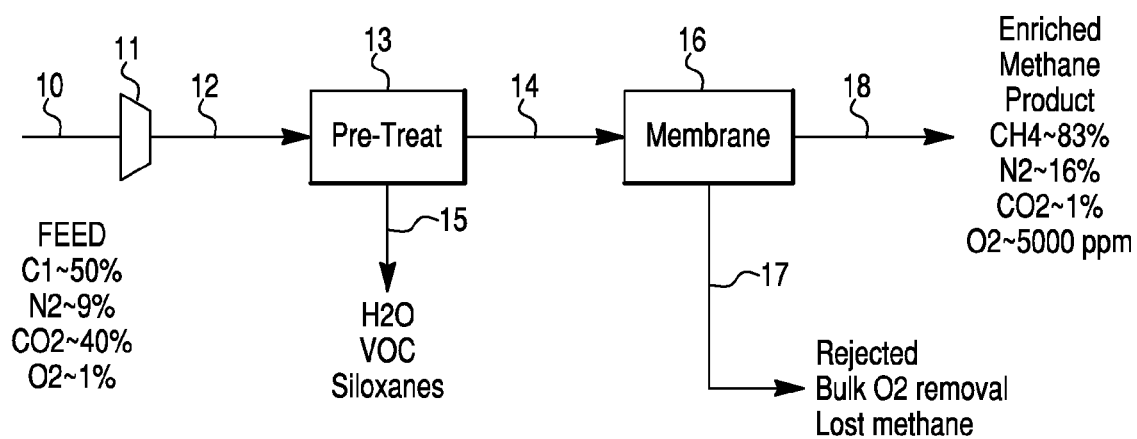
FIG. 1 is a schematic of a prior art oxygen removal system wherein the enriched methane product stream contains significant levels of oxygen.

The present invention is directed to an improved method for the removal of oxygen to low levels from contaminated methane without the use of a oxygen reacting catalytic system. The separation, described in more detail below, is based upon the inclusion of a carbon molecular sieve (CMS) adsorbent in a pressure swing adsorption (PSA) process, which permits the adsorption and removal of oxygen to low levels. This method may be used for upgrading sub-quality methane sources, such as landfill gas, coalmine methane, coal bed methane, natural gas wells, biogas, etc.

One sub-quality methane feedstream suitable for separation is a product gas from a landfill. FIG. 1 illustrates a typical prior art oxygen removal system for landfill gas. While two or more stages of membranes can be used, a single stage is shown in FIG. 1 for clarity. In such a process, a feed stream 10 containing methane (~50%), nitrogen (~9%), carbon dioxide (~40%), and oxygen (~1%) is directed to a compressor 11. The compressed stream 12 is then sent to a pre-treatment step 13 where water, VOCs, and siloxanes are removed as line 15. Such pre-treatment steps can include, for example, cooling and condensation, adsorbent and absorbent media, dehydration, or other means. Stream 14, now largely free of volatile liquid impurities, is then sent to the membrane unit 16 where the bulk of the carbon dioxide and oxygen are removed via line 17 as permeate. Some methane values may also be lost, and multiple stage membranes are often used to minimize methane losses. The composition of the enriched non-permeated methane product stream 18 is typically methane (~83%), nitrogen (~16%), carbon dioxide (~1%), and oxygen (~5000 ppm). As can be seen by FIG. 1, a typical raw gas from a landfill will have the oxygen content thereof reduced from 1% to 5,000 ppm by using a typical membrane unit for the bulk removal of oxygen.

For the bulk removal of oxygen in the prior art process, a variety of types of suitable designs of membrane separation systems can be used depending upon the desired gas separation. Thus, the membrane may be employed in plate and frame form, or may comprise spiral wound film membranes, tubular membranes, hollow fiber membranes, or the like. The use of hollow fiber membranes is generally preferred due to the high surface area per unit of membrane that can be obtained thereby. It will be appreciated that, when membranes are used in tubular or hollow fiber form, a plurality of such membranes can conventionally be arranged in parallel bundle form. In such embodiments, the feed gas stream can be brought into contact with either the outer or shell side, or the inner or tube side of the membrane particles. Those skilled in the art will appreciate that the flow of the feed gas and of the permeating gas within the separation zone can be either cocurrent or countercurrent. Using bundles of hollow fiber and tubular membranes, the passage of feed gas can be either radial or axial with respect to the direction in which the hollow fibers or tubular membranes are positioned within the separation zone.

Typical of the types of membrane materials utilized in membrane separation processes include metallic and inorganic membranes as well as various organic polymeric materials or such organic polymeric materials mixed with inorganic materials such as fillers, reinforcements and the like. Organic polymers that may be considered for various practical commercial operations include such materials as polysulfones; polystyrenes, including such styrene-containing polymers as acrylonitrile, styrene copolymers, styrene-butadiene and styrene-vinylbenzyl halide copolymers; cellulosic polymers, such as cellulose acetate, cellulose acetate-butyrate, methyl or ethyl cellulose; polyamides and polyimides; polycarbonates; polyurethanes; polyesters, including polyacrylates, polyethylene; polypropylene; polyvinyl pyridines, and the like. Such polymers may be either substituted or unsubstituted, with typical substituents of such substituted polymers including halogens, such as chlorine, fluorine and bromine; hydroxyl groups; lower alkyl groups; monocyclic aryl; lower acyl groups, etc.

The use of a permeable membrane in conjunction with a coating material is also known, with such combinations enabling good selectivity of separation to be achieved together with high flux through the membrane. Typical coatings include substituted or unsubstituted polymers that are either solid or liquid under gas separation conditions. Examples of such coating materials include synthetic and natural rubbers, organic prepolymers, polyurethanes, polyamines, polyesters and the like. The coatings may be polymerized either before or after the application thereof to the permeable membrane with which they are to be employed. The above descriptions of membrane designs, types of materials and coatings are provided for illustrative purposes and form no significant part of the present invention.

While the prior art oxygen removal system is suitable for the bulk removal of oxygen (to a concentration level of around 5000 ppm), if a methane product specification of oxygen of 2,000 ppm or less is required, then the natural gas stream must be further treated to reach the desired purity or if the additional oxygen is removed through additional membrane area a higher methane loss is tolerated. A catalytic system to further remove the oxygen to the desired concentration is known and can be added to the prior art membrane-type oxygen removal system. However, the use of a catalytic system involves catalyst and equipment costs and loss of methane product.

The present invention relates to a method for achieving low oxygen levels in product methane streams without the use of a catalytic system. The method for achieving low oxygen levels in methane product streams from natural gas feeds, including landfill gas streams, involves using a first separation system to remove the bulk of the oxygen from the natural gas feed and using a second separation system to reduce the oxygen concentration of the product stream from the first separation unit to the desired levels. In one embodiment, the method of removing oxygen from a natural gas feed stream comprises: (1) compressing the feed stream; (2) pre-treating the compressed feed stream to remove water, VOCs and siloxane impurities; (3) using a membrane unit to remove of the bulk of the $CO_2$ and oxygen from the feed stream; and (4) using a pressure swing adsorption (PSA) system that utilizes a carbon molecular sieve (CMS) adsorbent for the adsorption of oxygen to remove the oxygen from the feed stream to the desired low concentration levels. In the above process, the first two steps have no or minimal impact upon oxygen removal from the natural gas feed stream. The membrane unit removes the bulk of the oxygen from the feed stream and the carbon molecular sieve PSA unit removes the residual oxygen from the treated feed stream to the level required by the pipeline. One additional advantage of the invention is that the CMS PSA bed also removes $CO_2$ from the natural gas feed stream resulting in further enrichment of the methane product stream. While the embodiment describes using a membrane unit as the first separation system to remove the bulk of the oxygen from the natural gas feed, other separation units, including pressure swing adsorption units, could be used.

FIG. 2 illustrates an embodiment of the invention. The oxygen removal system to treat a natural gas stream is similar to the system displayed in FIG. 1 except that a CMS PSA unit is added after the membrane separation unit. If the pipeline specifications require a low oxygen specification in the methane product stream, such as 1000 ppm of $O_2$, then the carbon molecular sieve bed removes oxygen from the treated feed stream to this purity level. In practice, the membrane and CMS beds operation can be adjusted to compensate for changes in the feed composition and desired product purity.

In FIG. 2, a typical natural gas feed stream 20 containing methane (~50%), nitrogen (~9%), carbon dioxide (~40%), and oxygen (~1%) is directed to a compressor 22. The feed stream is compressed from about atmospheric to 50-800 psig, more preferably 100-300 psig, and most preferably 100-250 psig. The compressed stream 24 is then sent to a pre-treatment step 26 where water, VOCs, and siloxanes are removed as line 28. Such pre-treatment steps include, for example, cooling and condensation, adsorbent and absorbent media, dehydration, or other means. Stream 30, now largely free of water, VOCs and siloxane liquid impurities, is then sent to the membrane unit 32 where the bulk of the carbon dioxide and oxygen are removed via line 34 as permeate. Some methane values may also be lost, and multiple stage membranes are often used to minimize methane losses. The enriched non-permeated methane product stream 36 is fed to the carbon molecular sieve PSA unit 38, which removes the residual oxygen from stream 36 to the required oxygen purity level. A high purity methane output stream 42 is discharged at one end of the PSA unit 38. The PSA unit 38 also delivers an output stream 40 containing the desorbed impurities from the adsorption beds, which is generally referred to as "tail gas". The tail gas stream 40 issues at a relatively low pressure. The composition of the tail gas 40 is enriched in oxygen relative to the non-permeate feed gas stream 36 to the PSA unit 38. The CMS bed in PSA unit 38 also removes a portion of the nitrogen, and a reasonable amount of methane is also removed with the oxygen. Because this methane loss from CMS PSA unit 38 may not be acceptable, the tail gas stream 40 from the CMS bed is removed at low pressure and can be recycled, in full or in part, back to feed stream 20 via lines 44 and 46. This recycle allows the previously adsorbed oxygen to be substantially rejected by membrane unit 32 and also allows for the bulk of the methane in recycle streams 40, 44 and 46 to be recovered as sales gas in the methane product stream 42. With this recycle stream 40, 44 and 46 the enriched methane product in the methane product stream 42 would, for example, have the following composition: methane (~88%), nitrogen (~12%), carbon dioxide (~0%), and oxygen (~1000 ppm).

The PSA process is of itself a well-known means of separating and purifying a less readily adsorbable gas component contained in a feed gas mixture of said component with a more readily adsorbable second component, considered as an impurity or otherwise. Adsorption commonly occurs in multiple beds at an upper adsorption pressure, with the more selectively adsorbable second component thereafter being desorbed by pressure reduction to a lower desorption pressure. The beds may also be purged, typically at such lower pressure for further desorption and removal therefrom of said second component, i.e., the removal of impurities with respect to a high purity product gas, before repressurization of the beds to the upper adsorption pressure for the selective adsorption of said second component from additional quantities of the feed gas mixture as the processing sequence is carried out, on a cyclic basis, in each bed in the PSA system. Such PSA processing is disclosed in the Wagner patent, U.S. Pat. No. 3,430,418, and in the Fuderer et al. patent, U.S. Pat. No. 3,986,849, wherein cycles based on the use of multi-bed systems are described in detail. Such cycles are commonly based on the release of void space gas from the product end of each bed, in so called cocurrent depressurization step(s), upon completion of the adsorption step, with the released gas typically being employed for pressure equalization and for purge gas purposes. The bed is thereafter countercurrently depressurized and/or purged to desorb the more selectively adsorbed component of the gas mixture from the adsorbent and to remove such gas from the feed end of the bed prior to the repressurization thereof to the adsorption pressure.

The PSA system can be operated with at least one, and typically at least two adsorbent beds, as may be desirable in the given applications, with from three to about 12 or more adsorbent beds commonly being employed in conventional practice.

While carbon molecular sieves are the preferred adsorbent to remove oxygen, it will also be understood that the invention can be carried out using any suitable adsorbent material in the adsorption zones having a selectivity for oxygen over other such components in the feedstream, such as CTS-1.

In one embodiment, the tail gas from the CMS PSA unit is recycled back to the feed of the membrane unit. Because the membrane unit rejects the bulk of the oxygen, the oxygen removed by the CMS PSA bed is, in turn, rejected with the $CO_2$ by the membrane unit and with this recycle, methane losses due to the addition of the CMS bed are minimized.

Even providing the improved process as shown in FIG. 2, a typical methane product stream 42 may still contain over about 10% nitrogen, and such a level of nitrogen would usually not be acceptable for pipeline specifications. In upgrading landfill gas, the nitrogen in the raw natural gas varies widely and the amount of nitrogen in the methane product stream will be a function of the nitrogen in the landfill's raw feed gas. In one embodiment, where nitrogen removal is required from the methane product stream, Molecular Gate® systems can be applied wherein the Molecular Gate® unit is placed after the membrane unit and serves to adsorb nitrogen from the feed along with any residual $CO_2$ from the membrane unit's methane product stream. A conventional Molecular Gate® unit will also remove a portion of the oxygen from the membrane unit's methane product stream; however, oxygen removal to very low levels is not achieved without substantial losses of methane. Thus, where nitrogen removal from the methane product stream to low levels is required and where the CMS bed does not remove the nitrogen to a low enough level due to the amount of nitrogen in the raw natural gas, a further improvement of this invention can be seen in FIG. 2 and utilizes the process steps of (1) compressing the natural gas feed stream 20 with a compressor 22; (2) pre-treating the compressed natural gas feed stream 24 in a pre-treatment step 26 where impurities, such as water, VOCs and siloxanes are removed as line 28; (3) using a membrane unit 32 on the pre-treated stream 30 to remove bulk oxygen and $CO_2$ via line 34 as permeate; (4) using a nitrogen removal system 41, such as the Molecular Gate® system, on the membrane unit's non-permeate stream 35 for residual $CO_2$ and nitrogen rejection, along with some oxygen removal, where the nitrogen-heavy stream is removed as stream 39 and the nitrogen-reduced stream 37 is fed to the CMS PSA system 38; and (5) using a CMS PSA system 38 to reduce the oxygen concentration of the methane product stream 42 to the desired purity levels. A high purity methane output stream 42 is discharged at one end of the PSA unit 38. The PSA unit 38 also delivers a tail gas stream 40 which can be recycled as discussed above. In the example above, the CMS bed's main purpose is to remove oxygen from the natural gas feed stream and the sales gas leaves the CMS bed while the tail gas from the CMS bed is recycled back through the membrane unit for bulk oxygen removal and to improve the methane recovery rate.

In another embodiment, the Molecular Gate® system is used after the CMS PSA system, so the process steps can be seen in FIG. 2 and comprise (1) compressing the natural gas feed stream 20 with a compressor 22; (2) pre-treating the compressed natural gas feed stream 24 in a pre-treatment step 26 where impurities, such as water, VOCs and siloxanes are removed as line 28; (3) using a membrane unit 32 on pretreated stream 30 to remove bulk oxygen and $CO_2$ via line 34 as permeate; (4) feeding the enriched methane product stream 36 to a CMS PSA system 38, which removes the residual oxygen from stream 36 to the required oxygen purity level; (5) sending the methane output stream 43 from the CMS PSA system 38 to a nitrogen removal system 49, such as the Molecular Gate® system, for residual $CO_2$ and nitrogen rejection, along with some oxygen removal, where the nitrogen-heavy stream is removed as stream 45 and the reduced nitrogen stream 47 is delivered as the high purity methane product stream. The PSA unit 38 also delivers an tail gas stream 40 which can be recycled as discussed above. In addition, the tail gas stream 45 from the nitrogen removal system 47, such as the Molecular Gate® system, can be recycled, in full or in part, back to feed or as part of the recycled tail gas stream 40.

In still another embodiment, the carbon molecular sieve adsorption is incorporated within the Molecular Gate® beds. In this manner, the Molecular Gate® system both removes nitrogen and oxygen in a single step. It is noted that in this use the amount of gas permitted to be recycled from the Molecular Gate® unit is limited if nitrogen rejection is required and the process may be less advantageous as compared to using a separate carbon molecular sieve bed and PSA.

The Molecular Gate® system, an effective PSA process for the removal of nitrogen from natural gas, is described, for example, in U.S. Pat. No. 6,197,092, issued Mar. 6, 2001. In general, the process involves a first pressure swing adsorption of the natural gas stream to selectively remove nitrogen and produce a highly concentrated methane product stream. Secondly, the waste gas from the first PSA unit is passed through a PSA process which contains an adsorbent selective for methane so as to produce a highly concentrated nitrogen product. One important feature of the Molecular Gate® system is the nitrogen selective adsorbent in the first PSA unit. This adsorbent is a crystalline titanium silicate molecular sieve, and the adsorbent is based on ETS-4 which is described in U.S. Pat. No. 4,938,939. ETS-4 is a novel molecular sieve formed of octrahedrally coordinated titania chains which are linked by tetrahedral silicon oxide units. The ETS-4 and related materials are, accordingly, quite different from the prior art aluminosilicate zeolites which are formed from tetrahedrally coordinated aluminum oxide and silicon oxide units. A nitrogen selective adsorbent useful in the process described in U.S. Pat. No. 6,197,092 is an ETS-4 which has been exchanged with heavier alkaline earth cations, in particular, barium. It has also been found that in appropriate cation forms, the pores of ETS-4 can be made to systematically shrink from slightly larger than 4 Å to less than 3 Å during calcinations, while maintaining substantial sample crystallinity. These pores may be frozen at any intermediate size by ceasing thermal treatment at the appropriate point and returning to ambient temperatures. These materials having controlled pore sizes are referred to as CTS-1 (contracted titano silicate-1) and are described in U.S. Pat. No. 6,068,682, issued May 30, 2000, incorporated herein by reference in its entirety. The CTS-1 molecular sieve is particularly effective in separating nitrogen and acid gases selectively from methane as the pores of the CTS-1 molecular sieve can be shrunk to a size to effectively adsorb the smaller nitrogen and carbon dioxide and exclude the larger methane molecule. The barium-exchanged ETS-4 for use in the separation of nitrogen from a mixture of the same with methane is described in U.S. Pat. No. 5,989,316, issued Nov. 23, 1999. Reference is also made to U.S. Pat. No. 6,315,817 issued Nov. 13, 2001, which also describes a pressure swing adsorption process for removal of nitrogen from a mixture of same with methane and the use of the Ba ETS-4 and CTS-1 molecular sieves. Due to the ability of the ETS-4 compositions, including the CTS-1 molecular sieves for separating gases based on molecular size, these molecular sieves have been referred to as Molecular Gate® sieves.

The invention claimed is:
1. A process for the improved separation of oxygen from a natural gas feed stream which comprises:
   a. passing said natural gas feed stream to a first separation unit so as to partially separate oxygen from said feed stream and produce a first product stream enriched with methane and a waste stream having a higher molar concentration of oxygen than said feed stream; and b. passing said first product stream to a second separation unit containing an oxygen-selective adsorbent comprising a carbon molecular sieve and operated with a pressure swing so as to preferentially adsorb residual said oxygen from said first product stream to produce a low pressure gas stream enriched with oxygen and produce a higher pressure second product stream enriched with methane and having an oxygen content of less than 2,000 ppm.

2. The process of claim 1, wherein the natural gas feed stream comes from landfill gas, coal mine methane, coal bed methane, natural gas wells, or biogas.

3. The process of claim 1, wherein said natural gas is from landfill gas.

4. The process of claim 1, wherein said first separation unit is a membrane unit.

5. The process of claim 4, wherein said first product stream is a non-permeate stream.

6. The process of claim 1, wherein said first separation unit is a pressure swing adsorption unit.

7. The process of claim 1, wherein said low pressure gas stream of said second separation unit is recycled back to said natural gas feed stream.

8. The process of claim 1, wherein the oxygen concentration of said second product stream is about 1000 ppm or less.

9. The process of claim 1, wherein the oxygen concentration of said second product stream is about 100 ppm or less.

10. The process of claim 1, further comprising: prior to passing said first product to said second separation unit;

a. passing said first product stream to a pressure swing adsorption nitrogen removal unit so as to remove nitrogen from said first product stream to produce a low pressure tail gas enriched with nitrogen and produce a higher pressure nitrogen-depleted product stream; and b. passing said nitrogen-depleted product stream to said second separation unit.

11. The process of claim 10, wherein the nitrogen removal unit contains a molecular sieve selective for adsorbing nitrogen.

12. The process of claim 11, wherein nitrogen concentration of said second product stream is about 7% or less.

13. The process of claim 11, wherein the nitrogen concentration of said second product stream is about 4% or less.

14. The process of claim 1 comprising passing said first product stream to a pressure swing adsorption unit containing a combination of said carbon molecular sieve adsorbent and a nitrogen selective adsorbent.

15. The process of claim 14, wherein said nitrogen selective adsorbent is ETS-4 or CTS-1.

16. The process of claim 1, wherein said second product stream is directed to a pressure swing adsorption unit containing a nitrogen selective adsorbent.

17. The process of claim 11, wherein said molecular sieve is ETS-4 or CTS-1.

18. The process of claim 1 wherein said first separation unit also removes carbon dioxide.

19. A process for the improved separation of oxygen from a natural gas feed stream, which comprises:

a. passing said natural gas feed stream to a membrane separation unit so as to partially separate oxygen from said feed stream and produce a first product stream enriched with methane and a permeate waste stream having a higher molar concentration of oxygen than said feed stream;

b. passing said first product stream to a pressure swing adsorption unit containing a carbon molecular sieve so as to preferentially adsorb residual oxygen from said first product stream to produce a low pressure gas stream enriched with oxygen and to produce a second product stream enriched with methane and having an oxygen content of 1,000 ppm or less; and c. recycling said low pressure gas stream back to said feed stream for said membrane separation unit.

20. The process of claim 19, wherein said first separation unit also removes carbon dioxide.

21. The process of claim 19, further comprising: prior to passing said first product to said second separation unit;

a. passing said first product stream to a pressure swing adsorption nitrogen removal unit so as to remove nitrogen from said first product stream to produce a low pressure tail gas enriched with nitrogen and produce a higher pressure nitrogen-depleted product stream; and b. passing said nitrogen-depleted product stream to said second separation unit.

* * * * *